US012691392B2

(12) United States Patent
Peek et al.

(10) Patent No.: US 12,691,392 B2
(45) Date of Patent: Jul. 28, 2026

(54) SYSTEM FOR REMOVING SOLIDS FROM A SEPARATOR AND METHOD THEREFOR

(71) Applicant: Expro North Sea Limited, Dyce (GB)

(72) Inventors: Gary Peek, Dyce (GB); Duncan Cleland, Dyce (GB); Anthony James Maclauchlan, Huntly (GB); Daniel James William Kennard, Balmedie (GB)

(73) Assignee: Expro North Sea Limited, Dyce (GB)

( * ) Notice: Subject to any disclaimer, the term of this patent is extended or adjusted under 35 U.S.C. 154(b) by 528 days.

(21) Appl. No.: 18/022,445

(22) PCT Filed: Jul. 22, 2021

(86) PCT No.: PCT/EP2021/070588
§ 371 (c)(1),
(2) Date: Feb. 21, 2023

(87) PCT Pub. No.: WO2022/037895
PCT Pub. Date: Feb. 24, 2022

(65) Prior Publication Data
US 2023/0311027 A1      Oct. 5, 2023

(30) Foreign Application Priority Data
Aug. 21, 2020    (GB) ..................................... 2013112

(51) Int. Cl.
*B01D 21/00* (2006.01)
*B01D 21/24* (2006.01)
(Continued)

(52) U.S. Cl.
CPC ..... *B01D 21/2472* (2013.01); *B01D 21/0024* (2013.01); *B01D 21/302* (2013.01);
(Continued)

(58) Field of Classification Search
CPC ............ B01D 21/0024; B01D 21/2472; B01D 21/302; B08B 9/0933
See application file for complete search history.

(56) References Cited

U.S. PATENT DOCUMENTS

| | | | | | |
|---|---|---|---|---|---|
| 3,236,689 | A | * | 2/1966 | Simmons, Jr. | .......... B05B 9/002 239/11 |
| 4,913,819 | A | * | 4/1990 | Patterson | .............. B08B 9/0933 134/182 |

(Continued)

FOREIGN PATENT DOCUMENTS

| | | | |
|---|---|---|---|
| CA | 2230306 A1 | 8/1999 | |
| EP | 1126904 B1 | * 7/2003 | ........ B01D 21/0021 |

*Primary Examiner* — Bradley R Spies

(57) ABSTRACT

A system for removing sedimentary solids from a separator is provided. The separator is for separating components of well fluid produced by a well. The system includes an inlet for receiving motive fluid; a nozzle configured to introduce the motive fluid to the sedimentary solids in the separator, thereby fluidizing the sedimentary solids; and an outlet configured to allow the fluidized solids to exit the separator. The motive fluid includes well fluid produced from the well. A separator, method for removing sedimentary solids from a separator, and method of removing solids from well fluid produced by a well are also provided.

13 Claims, 6 Drawing Sheets

(51) Int. Cl.
    *B01D 21/30*         (2006.01)
    *B01D 21/34*         (2006.01)
    *B08B 9/093*         (2006.01)
    *E21B 43/34*         (2006.01)

(52) U.S. Cl.
    CPC ............ *B01D 21/34* (2013.01); *B08B 9/0933*
    (2013.01); *E21B 43/35* (2020.05); *B08B*
    *2209/08* (2013.01)

(56)         References Cited

U.S. PATENT DOCUMENTS

| | | | |
|---|---|---|---|
| 5,774,816 A * | 6/1998 | Fontenot | E21B 43/34 |
| | | | 588/1 |
| 6,619,889 B1 | 9/2003 | Sinker | |
| 2019/0063203 A1 | 2/2019 | Arefjord | |

* cited by examiner

400
Providing a fluidizing device

402
Connecting the inlet of the fluidizing device to a source of well fluid

404
Fluidizing, using motive fluid, solids present in a separator

406
Drawing the fluidizing solids from an outlet of the fluidizing device

502
Flowing motive fluid from well fluid before the well fluid is introduced into a separator

504
Passing the motive fluid through an inlet of a fluidizing device

506
Drawing fluidized solids from an outlet of the fluidizing device

SYSTEM FOR REMOVING SOLIDS FROM A SEPARATOR AND METHOD THEREFOR

This application claims priority to PCT Patent Appln. No. PCT/EP2021/070588 filed Jul. 22, 2021, which claims priority to Great Britain Patent Appln. No. 2013112.4 filed Aug. 21, 2020, which are hereby incorporated herein by reference in their entireties.

BACKGROUND OF THE INVENTION

1. Technical Field

The subject application generally relates to separators, and specifically to a system for removing solids from a separator, the separator for separating components of well fluid produced by a well, and a method therefor.

2. Background Information

After an onshore or offshore oil and gas well is drilled, and prior to production starting from the well, the well must be cleaned. Well clean-up removes, among other elements, drilling debris and fluids. After well clean-up production is started from the well for a relatively short time in order to identify the types and magnitudes of the various components of the production fluid, and in order to estimate the production capacities of the well. These tests are commonly referred to as well testing.

A separator may be used to separate well fluids produced from oil and gas wells into gaseous and liquid components. The term fluid includes both liquids and gases. Separators may be used during well clean-up and/or well-testing.

Separators are generally cylindrical or spherical pressure vessels which may be horizontal or vertical. Separators may separate oil and gas (two-phase separator); oil, gas and water (three-phase separator); or oil, gas, water and solid particulate (four-phase separator). Additionally, separators can be categorized according to their operating pressure. Low-pressure separators handle pressures of 10 to 180 psi (69 to 1241 kPa). Medium-pressure separators operate from 230 to 700 psi (1586 to 4826 kPa). High-pressure separators handle pressures of 975 to 2200 psi (6722 to 15,168 kPa).

Separators typically include various internal mechanical devices to assist the separation of components such as: an inlet diverter plate, one or more coalescent plates, a vortex breaker, a mist extractor and a weir barrier. Gravity segregation is the main force that accomplishes the separation within the separator, which means the heaviest fluid settles to the bottom of the separator and the lightest fluid rises to the top of the separator. While separators may be used to separate components of well fluid, improvements are desired.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

According to an aspect of the disclosure, there is provided system for removing sedimentary solids from a separator, the separator for separating components of well fluid produced by a well, the system comprising: an inlet for receiving motive fluid; a nozzle configured to introduce the motive fluid to the sedimentary solids in the separator, thereby fluidizing the sedimentary solids; and an outlet configured to allow the fluidized solids to exit the separator, wherein the motive fluid comprises well fluid produced from the well.

The system removes solids present in a separator. Thus, oil, gas and/or water discharged from the separator have fewer solids present in their respective fluid streams improving production and reducing downstream costs.

The system uses well fluid produced by a well as the motive fluid for the fluidizing device. Thus, a separate fluid source is not required to provide the motive fluid. This reduces costs as additional equipment, namely the additional fluid source and associated pumps, is not required.

Furthermore, the system may be used in offshore environment where space is a premium. The footprint of the separator may be limited by the limited space available at an offshore well location. Reducing the number of components required, e.g. a fluid source for the nozzle and any associated pump, reduces the footprint of the separator. This reduction in space required by the separator may improve safety at the offshore well and allow for other equipment to occupy the space allowing for additional functionality at the offshore well.

In addition, as the motive fluid is well fluid produced by a well, the system may function continuously during operation of the well without stopping operation of the well. The system may provide online or in-line removal of solids while the solids, present in the well fluid, flow through the separator. This may reduce well clean-up time and costs. Additional, well testing time and costs may be reduced.

The system may comprise a motive fluid line for introducing the motive fluid into the inlet. The motive fluid line may be connected to a well fluid line. The well fluid line may be for introducing the well fluid into the separator. The motive fluid line may draw fluid from a well fluid line for introducing the well fluid into the separator.

The system may comprise a control valve for controlling flow of the motive fluid through the motive fluid line from the well fluid line. The control valve may be configured to create pressure such that well fluid flows through the motive fluid line. Controlled flow of the motive fluid through the motive fluid line from the well fluid line may ensure that a required pressure of the well fluid fed into the separator is not affected by the well fluid flowing through the motive fluid line. The control valve may be at least partially closed to create pressure necessary for the well fluid to flow through the motive fluid line to the inlet then nozzle to fluidizing sedimentary solids.

The system may comprise an inlet valve for controlling flow of the motive fluid into the inlet. The inlet valve may be configured to control introduction of the motive fluid into the separator for fluidizing the sedimentary solids in the separator. The inlet valve may be configured to be opened to allow flow of motive fluid through the inlet and nozzle to fluidize sedimentary solids present in the separator. The inlet valve may be configured to be closed to prevent flow of motive fluid through the inlet and nozzle to fluidize sedimentary solids present in the separator.

The system may comprise an outlet valve for controlling flow of the fluidized solids from the outlet. Controlling flow of the fluidized solids may control removal of the fluidized solids from the separator.

The system may comprise a controller for controlling operation of any one of the control, inlet and outlet valves based on a parameter of at least one of the motive fluid and the fluidized solids.

The parameter may comprise a flow rate, an absolute pressure or a differential pressure.

The parameter may comprise an absolute pressure of the motive fluid line. The parameter may comprise a differential pressure of the well fluid entering the separator and the motive fluid in the well fluid line.

The controller may be configured to control multiple inlet and/or outlet valves associated with other inlets, nozzles and outlets. The controller may be configured to control opening or operation of one of the inlet or outlet valves associated with the other inlets, nozzles and outlets based on the parameter. The controller may be configured to control opening of an inlet valve associated with a particular inlet and nozzle based on a differential pressure of the well fluid entering the separator and the motive fluid in the well fluid line such that sufficient pressure is available to operate the separator for removing water, oil and/or water from the well fluid.

The inlet and/or outlet may be external to the separator. The motive fluid line, inlet valve and/or outlet valve may alternatively or additionally be external to the separator.

Conventional fluidizing devices are located entirely within the separator. This reduces the inner volume of the separator which may reduce the operating capacity, flow rates and/or efficiency of the separator. Alternatively, the dimensions of the separator may be increased to offset the reduction in volume which may increase the separator footprint. In offshore well applications, where space is limited, this increase may negatively impact safety and well operations. As at least the above listed components of the system may be external to the separator, the volume occupied by the system within the separator may be reduced which may provide improved operating capacity, flow rates and/or efficiency over conventional fluidizing devices. Furthermore, the listed components being external to the separator may not negatively impact the footprint of the separator. These components may be contained within a frame enclosing the separator.

The outlet may be configured such that the fluidized solids flow through the outlet in a same direction as gravity. As the fluidized solids flow out of the separator in the same direction as gravity, one or more pumps may not be required to remove the fluidized solids from the separator. This may reduce the weight, volume and/or footprint of the separator and system which may save costs, improve efficiency and/or improve safety as described.

The nozzle may be configured to direct the motive fluid to entrain the sedimentary solids.

The nozzle may be configured to direct the motive fluid to generate a vortex to fluidize the sedimentary solids.

The outlet may be coaxial with the nozzle. The inlet may be configured such that motive fluid flows through the inlet tangentially to motive fluid flow through the nozzle.

The system may comprise a plurality of inlets, nozzles and/or outlets. The nozzles may be positioned along the pressure vessel at various locations.

The nozzle and outlet may form a fluidizing device.

The system may comprise multiple fluidizing devices.

The fluidizing devices may be operated individually. Operation of each fluidizing device may be based on a parameter of the system. Exemplary parameters include the flow rate of the motive fluid through the motive fluid line, the flow rate of fluidized solids from one or more of the fluidizing devices, the flow rate of motive fluid into one or more of the fluidizing devices, the differential pressure between the motive fluid and the well fluid flowing into the separator, the differential pressure between the motive fluid into one or more of the fluidizing devices and the fluidized solids from one or more of the fluidizing devices, and combinations thereof.

When the system comprises multiple nozzles, the controller may be configured to operate certain nozzles based on a parameter. For example, only a particular number of nozzles may be operated based on available fluid pressure. The controller may control operation, e.g. at least partially closing the control valve such that motive fluid flows through the motive fluid line to multiple inlet valves. The controller may control operation, e.g. opening one or more inlet valves such that motive fluid flows through the inlets and nozzles associated with the one or more inlet valves. Furthermore, only certain nozzles may be operated in order to fluidize sedimentary solids present at certain physical locations in the separator which correspond with the approximate locations of the nozzles. In this manner, a fluidizing map or profile may be established. This may more efficiently fluidize solids in the separator and may use available fluid pressure more efficiently.

According to another aspect, a separator comprising the described system is provided. The separator may comprise a pressure vessel which is generally horizontally or vertically oriented. The pressure vessel may be generally cylindrical or spherical.

According to another aspect, there is provided a separator for separating components of well fluid produced by a well, the separator comprising: a pressure vessel for receiving well fluid produced by a well; an inlet for introducing the well fluid into the pressure vessel; one or more mechanical devices within the pressure vessel, the devices for separating fluid components of the well fluid; one or more outlets for drawing one or more of the separated fluid components from the pressure vessel; and a system for removing sedimentary solids from the separator, the system comprising: an inlet for receiving motive fluid; a nozzle configured to introduce the motive fluid to the sedimentary solids in the separator, thereby fluidizing the sedimentary solids; and an outlet configured to allow the fluidized solids to exit the separator, wherein the motive fluid comprises well fluid produced from the well.

According to another aspect, there is provided a method for removing sedimentary solids from a separator, the separator for separating components of well fluid produced by a well, the method comprising: providing an inlet for receiving motive fluid, a nozzle configured to introduce the motive fluid through the sedimentary solids in the separator, thereby fluidizing the sedimentary solids, and an outlet configured to allow the fluidized solids to exit the separator; connecting the inlet to a source of well fluid produced by the well such that the motive fluid comprises well fluid produced by the well; fluidizing, using the motive fluid, sedimentary solids present in the separator; and flowing the fluidized solids from the outlet.

According to another aspect, there is provided a method of removing solids from well fluid produced by a well, the method comprising: flowing motive fluid from the well fluid before the well fluid is introduced into a separator for separating components of the well fluid; passing the motive fluid through an inlet of a fluidizing device for fluidizing solids present in the well fluid introduced into the separator; and flowing the fluidized solids from an outlet of the fluidizing device.

5
6

The described methods may provide one or more of the benefits described in respect of the system.

The method may further comprise controlling a flow rate of the motive fluid from the well fluid line.

Controlling the flow rate the motive fluid may comprise controlling operation of a control valve connected to the well fluid line.

Controlling the flow rate may be based on a parameter of the motive fluid.

The parameter may comprise a differential pressure.

The method may further comprise controlling a flow rate of the motive fluid through the fluidizing device.

Controlling the flow rate of the motive fluid may comprise controlling operation of an inlet valve connected to the inlet of the fluidizing device.

The method may further comprise controlling a flow rate of the fluidized solids from the fluidizing device.

Controlling the flow rate of the fluidized solids may comprise controlling operation of an outlet valve connected to the outlet of the fluidizing device.

Controlling the flow rate may be based on a parameter of the motive fluid and/or the fluidized solids.

The parameter may comprise a differential pressure of the motive fluid and/or the fluidized solids.

The described controlling may be performed by a controller. The controller may comprise one or more processors and computer-readable medium. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

According to another aspect, there is provided a computer-readable medium comprising instructions that, when executed by a processor, operates one or more flow control devices to perform the described methods.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials, such as silicon, polysilicon, high-K dielectric, copper, and so on.

The flow control devices may comprise any one of control valves (e.g. gate valve, check valve, globe valve, ball valve, butterfly valve), flow limiters, chokes, pumps, flow or pressure meters, flow or pressure gauges, and flow or pressure regulators.

BRIEF DESCRIPTION OF THE DRAWINGS

A description is now given, by way of example only, with reference to the accompanying drawings, in which.

DETAILED DESCRIPTION

Figure 1:
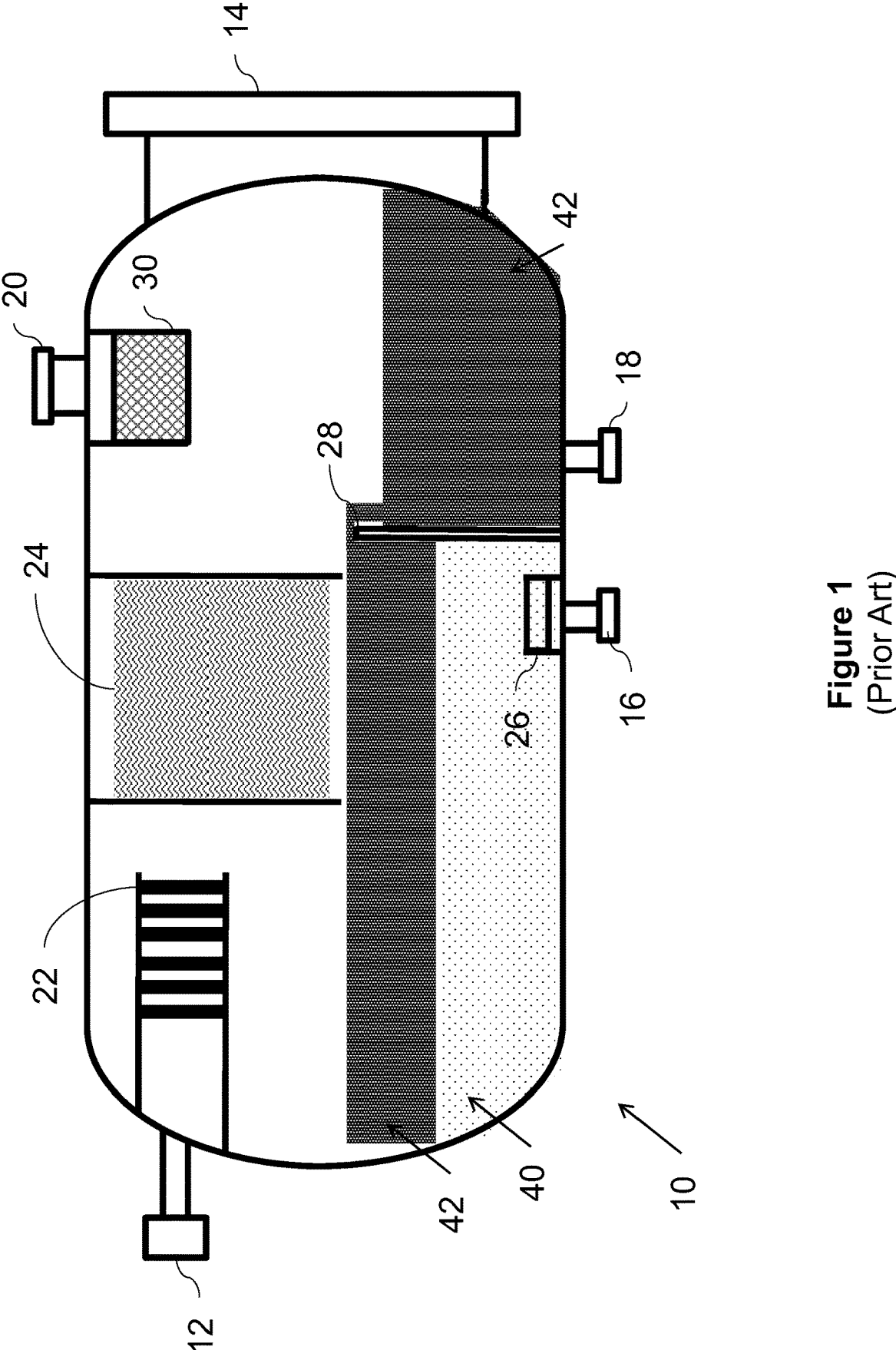
FIG. 1 is a diagram of a prior art separator.

Turning now to FIG. 1, a separator 10 is shown. The separator 10 is for separating components of well fluid produced from a well. The components may be in liquid, gas or solid form. Generally, the separator 10 comprises a pressure vessel having a fluid inlet through which well fluid produced by a well enters the separators. Components of the well fluid are separated and then exit the separator 10 via various outlets as will be described. In the illustrated arrangement, the pressure vessel is generally horizontally oriented. Furthermore, the pressure vessel is generally cylindrical. Gravity segregation is the main force that accomplishes the separation, which means the heaviest fluid settles to the bottom of the pressure vessel and the lightest fluid rises to the top of the pressure vessel.

In the illustrated arrangement, the separator 10 comprises inlet diverter plates 22, coalescing plates 24, a vortex breaker 26, a weir barrier 28 and a mist extractor 30 within the pressure vessel. These components function to separate fluid components of the well fluid which is fed into the separator 10 via an inlet 12 as will be described. The inlet 12 is located on one side of the separator 10 proximate the inlet diverter plates 22.

In particular, water 40 is separated from the well fluid and expelled via a water outlet 16, oil 42 is separated from the well fluid and expelled via an oil outlet 18, and gas is separated from the well fluid and expelled via an gas outlet 20. The pressure vessel has an access door 14 for accessing these and other components for maintenance and/or inspection.

In the illustrated arrangement, the water outlet 16 and oil outlet 18 are located at the bottom of the pressure vessel on either side of the weir barrier 28. The gas outlet 20 is located at the top of the pressure vessel as gas is a lighter fluid than oil 42 or water 40 and thus rises to the top of the pressure vessel. The access door 14 is located on one side of the pressure vessel, the side being generally opposite the location of the inlet 12.

The inlet diverter plates 22 provide initial gross separation of components by changing the flow directions of the incoming well fluid. The coalescent plates 24 reduce foaming at the gas and liquid interfaces by liberating gas bubbles from the oil. The vortex breaker 26 prevents vortices that may drag oil into a liquid outlet. In the illustrated arrangement, the vortex breaker 26 prevents vortices at the water outlet 16. The mist extractor 30 collects small liquid drops from the separated gas before the gas flows through the gas outlet 20. The weir barrier 28 is a physical barrier that separates the oil 42 and water 40 of the well fluid. The separator 10 may further include meters, valves and one or more controllers for measuring parameters and/or controlling components of the separator 10.

In use, well fluid produced by a well is introduced into the separator 10 via the inlet 12. The diverter plates 22 separate the fluid components of the well fluid. The coalescent plates 24 liberate the gas bubbles. The gas flows towards the gas outlet 20 and liquid drops are collected by the mist extractor 30 before the gas flows through the gas outlet 20.

The oil 42 and water 40 of the well fluid sink to the lower region of the pressure vessel of the separator 10. The oil 42 and water 40 naturally separate and an interface between the oil 42 and water 40 is formed. As water 40 is heavier than oil 42, the oil 42 sits on top of the water 40 within the pressure vessel, i.e. the water 40 is below the oil 42 with respect to the interface. Water 40 exits the separator via the water outlet 16 and the vortex breaker 26 prevents vortices from forming at the water outlet 16. The weir barrier 28 separates the oil 42 and water 40 such that oil 42 flows over the weir barrier 28 away from the water 40. The oil 42 exits the pressure vessel via the oil outlet 18. The various fluid outlets 16, 18 and 20 may be connected to pumps and/or tanks for drawing the separated fluids from the separator 10 and storing the separated vessels, respectively.

The described separator 10 is a three-phase separator as oil 42, gas and water 40 are separated from the well fluid. However, solids may also be present in the well fluid. Exemplary solids include solid particulate including drilling debris, sand, etc. Additionally, formation debris may be present. Removal of solids may be necessary during well clean-up and/or during well testing. As previously described, after an onshore or offshore oil and gas well is drilled, and prior to production starting from the well, the well must be cleaned. Well clean-up removes, among other elements, drilling debris and fluids. After well clean-up production is started from the well for a relatively short time in order to identify the types and magnitudes of the various components of the production fluid, and in order to estimate the production capacities of the well. These tests are commonly referred to as well testing. As such, solids may be removed from fluid passing through a separator. As such, a separator may be a four-phase separator in that oil, gas, water and solids are separated from fluid fed into the separator. The described solids may be sedimentary in that they have settled to the floor of the separator prior to removal.

Figure 2:
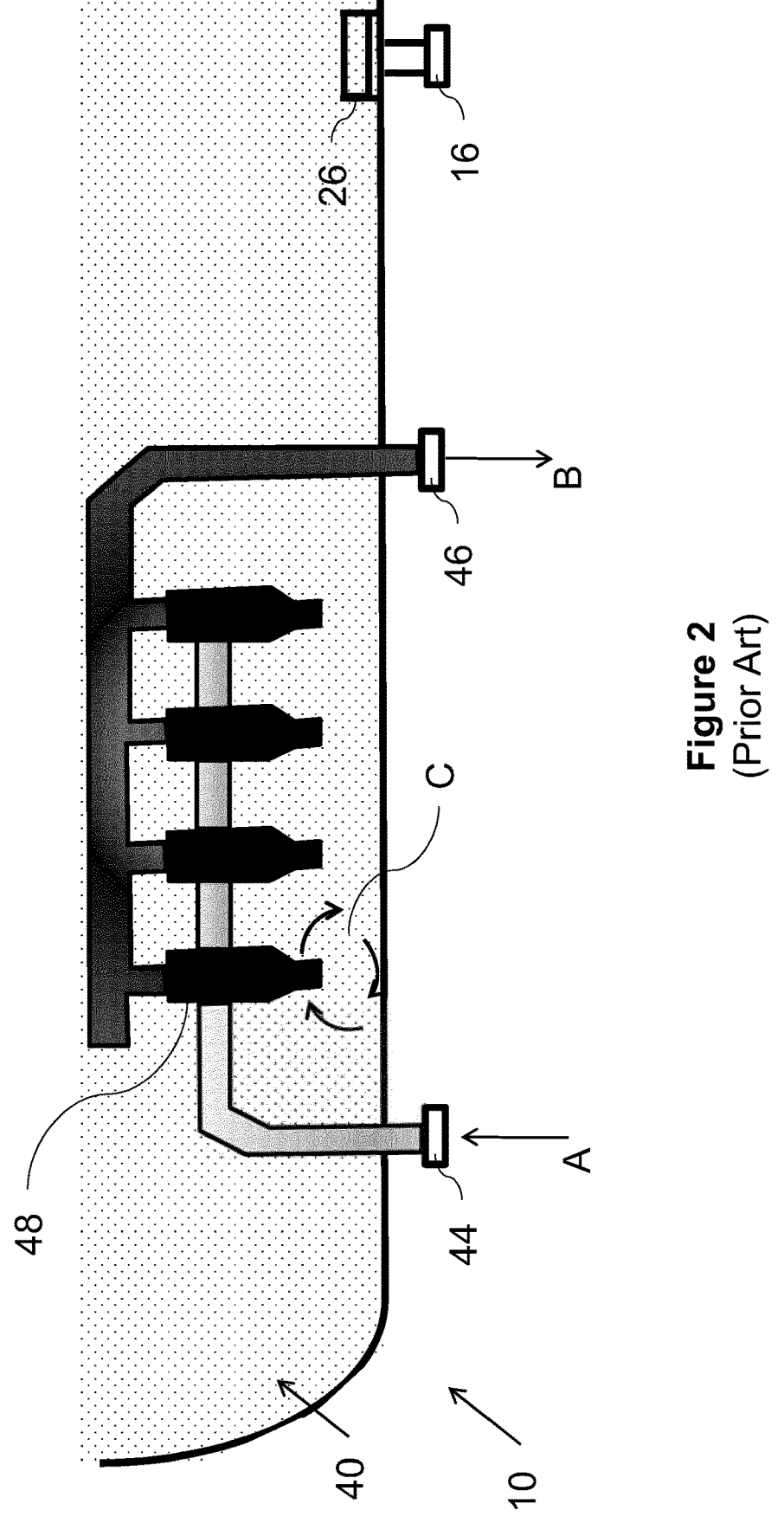
FIG. 2 is a diagram of a prior art solid removal system in the separator of FIG. 1.

Turning now to FIG. 2, a portion of the separator 10 is shown with a solid removal system for removing solids equipped to the separator 10. The solid removal system is for removing solids from fluid fed into the separator 10. The solid removal system is generally arranged at the bottom of the pressure vessel of the separator 10 as solids present in the fluid fed into the separator 10 settle to the bottom of the pressure vessel. Accordingly, the solids may be sedimentary, in that they have settled on the bottom of the separator 10.

In the illustrated arrangement, components of the solid removal system are generally proximate the water outlet 16 opposite the weir barrier 28. The solid removal system comprises a motive fluid inlet 44 and a solids outlet 46. The motive fluid inlet 44 is for introducing motive fluid into the separator. The motive fluid fluidizes solids for removal of the solids from the separator 10 as will be described. The solids outlet 46 is for fluidized solids to exit the separator 10. The solid removal system further comprises fluidizing devices 48. In the illustrated arrangement, four (4) fluidizing devices 48 are present in the solid removal system.

The motive fluid inlet 44 is connected to the fluidizing devices 48 via a pipe through which motive fluid is fed to a nozzle of each respective fluidizing device 48 to fluidize solids present in the separator 10. The fluidized solids are discharged from the fluidizing devices 48 via a discharge of each respective fluidizing device 48. The discharges connect to a pipe that leads to the solids outlet 46.

In use, high pressure fluid is pumped into the fluid water inlet 44 of the solid removal system by one or more high pressure pumps. This high pressure fluid is generally clean water, i.e. water that does not contain solids. The water forms the motive fluid for fluidizing solids. The motive fluid is pumped in direction A as shown in FIG. 2. The motive fluid flows through the motive fluid inlet 44 and into the fluidizing devices 48. The motive fluid is fed to the nozzles of the fluidizing device. The motive fluid fluidizes the solids present in separator 10. For example, the motive fluid may circulate within each fluidizing device 48 to create a vortex at the nozzle of the fluidizing device 48 in direction C. The vortex draws solids present in the separator 10 towards the fluidizing device 48 and up through the discharge of the fluidizing devices 48. The solids are accordingly fluidized by the motive fluid. Fluidize comprises causing the solids to flow like a fluid (e.g. liquid or gas), and suspending the solids (in particular solid particles) in the motive fluid to induce flowing motion of the motive fluid and solids. The fluidized solids flow up the discharge to the solids outlet 46 of the system. The fluidized solids are discharged from solids outlet 46 in direction B under pressure. The fluidized solids may then be stored in, for example, a solids collection vessel.

As will be appreciated, the described solid removal system requires a dedicated fluid source to form the motive fluid. Furthermore, the described solid removal system requires high pressure pumps to supply the motive fluid at sufficient pressure to fluidize the solids present in the separator 10. These additional components increase the size, in particular, the footprint of the separator. In offshore applications, space is a premium and as such the increased space requirements of a separator with the described solid removal system may reduce safety and efficiency, and generally negatively affect well operations. Furthermore, well clean-up and well testing may take more time resulting in production delays which may ultimately negatively impact profits realized by a well.

Furthermore, the use of one or more high pressure pumps and a fluid source may increase the weight of the separator and solid removal system which may increase transportation times and/or costs.

Figure 3:
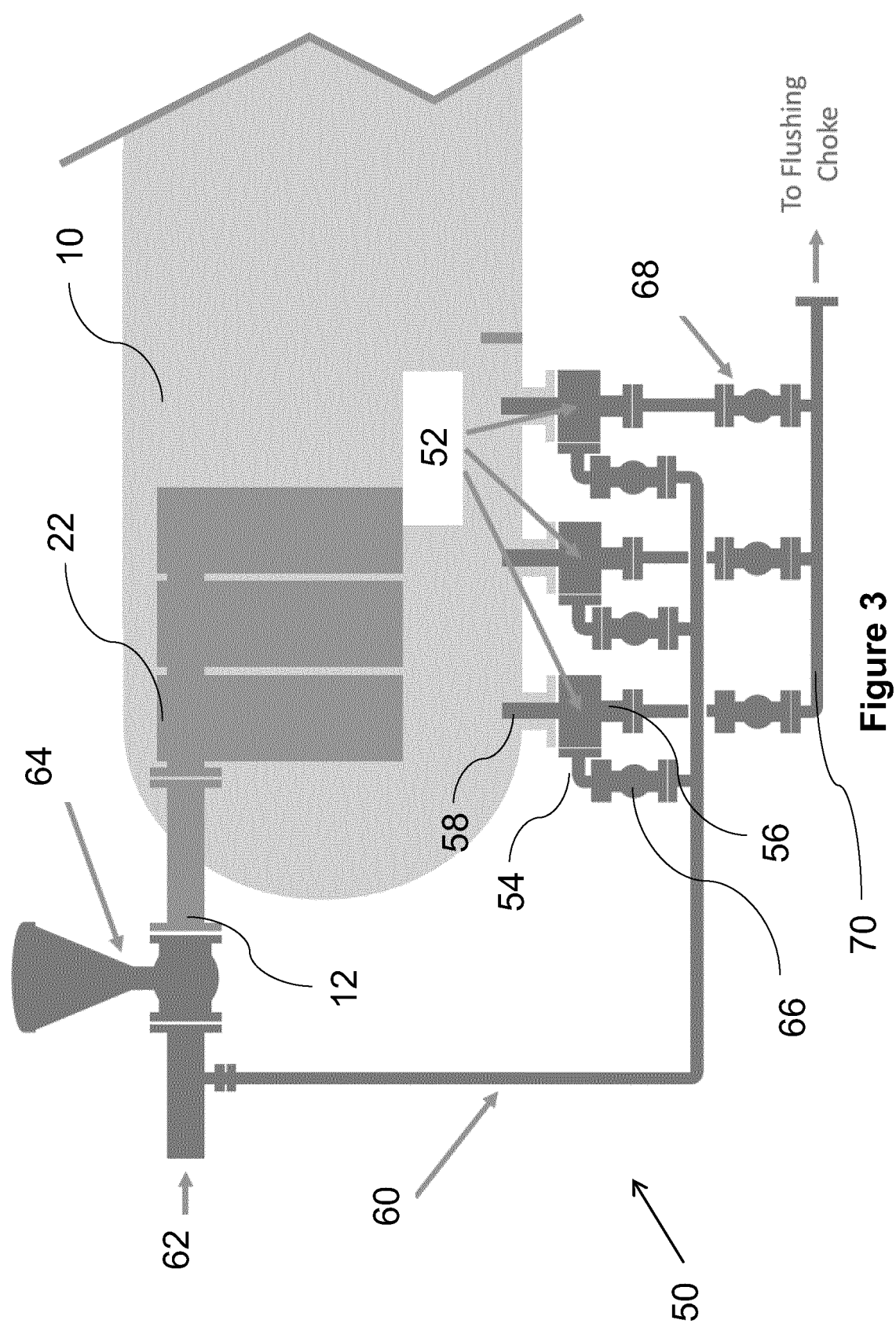
FIG. 3 is a diagram of a solid removal system.

FIG. 3 is a diagram of a solid removal system 50 for use with a separator. The solid removal system 50 is for removing solids from the separator. The separator is for separating components of well fluid produced by a well. The separator may be similar to the described separator 10. Exemplary solids include solid particulate including drilling debris, sand, etc. The solids may be sedimentary in that they have settled to the floor of the separator prior to removal.

The solid removal system 50 comprises a fluidizing device 52 for fluidizing solids present in well fluid produced by a well. Generally, the fluidizing devices 52 are fed motive fluid which comprises well fluid from a well. The well fluid is at pressure and is therefore able to fluidize the solids without additional pressurization. The well fluid may comprise oil, gas, water and solids. The well fluid may be drawn from the well using conventional techniques. The well may be an offshore or on shore well. The motive fluid fluidizes solids present in the separator 10. The fluidized solids exit the fluidizing devices 52 for storage in one or more storage vessels, e.g. tank.

As the motive fluid used to fluidize solids is well fluid, a separate fluid source is not required to remove solids from the separator. This may reduce the footprint, and cost of the separator 10 and solid removal system 50 over a prior art system. The reduction in footprint is particularly relevant of offshore applications as space is premium and any reduction in space may improve safe and well operations.

While the solid removal system 50 is for removing solids from the separator, upstream of the separator separate solid handling equipment may be present. This solid handling equipment may remove significant solids from the well fluid; however, solids may still remain in the well fluid.

In the illustrated embodiment, the solid removal system 50 comprises three (3) fluidizing devices 52. The fluidizing devices 52 are each connected to the separator 10 such that solids present within the pressure vessel may be fluidized and removed from the separator 10. In particular, the fluidizing devices 52 define a flow path for the solids to exit the separator 10. As previously described, the inlet diverter plates 22 provide initial gross separation of components by changing the flow directions of the incoming well fluid As the solids present in the separator 10 are heavier than the oil 42 and water 40, the solids sink to the bottom of the pressure vessel. Accordingly, the fluidizing devices 52 are located at the bottom of the pressure vessel of the separator 10. As will be described the majority of each fluidizing device 52 is external to the separator 10. Furthermore, positioning the fluidizing devices 52 generally at the bottom of the pressure vessel of the separator 10 allows for gravity to assist in drawing the solids within the pressure vessel into the fluidizing devices 52 for removal from the separator 10.

Each fluidizing device 52 comprises an inlet 54, a nozzle 58 and an outlet 56. The inlet 54 is for receiving motive fluid. Motive fluid for fluidizing solids is introduced via the inlet 54. The nozzle 58 is configured to introduce the motive fluid to solids in the separator 10, e.g. sedimentary solids in the separator 10. The outlet 56 is configured to allow the fluidized solids to exits to exit the separator 10.

The nozzle 58 provides a flow path for the motive fluid into the separator 10. Motive fluid is introduced to the solids in the separators 10 via the nozzle 58 thereby fluidizing the solids. The motive fluid fluidizes and entrains solids presents in the separator 10. For example, a vortex of motive fluid generated within the fluidizing device 52 may fluidize and entrain solids present in the separator 10. The fluidized solids are then drawn by the vortex to the outlet 56. The fluidized solids then exit the separator 10 via the outlet 56. Exemplary fluidizing devices 52 include Tore available from National Oilwell Varco.

Each inlet 54 is connected to a motive fluid line 60 through which motive fluid is provided. The motive fluid line 60 is for introducing motive fluid into the fluidizing devices 52. The motive fluid line 60 provides the well fluid which acts as motive fluid which is introduced into the separator 10. The well fluid is at pressure and is therefore able to fluidize the solids without additional pressurization. Well fluid to be separated is introduced into the separator 10 via the well fluid line 62 which feeds the separator inlet 12. The motive fluid line 60 is connected to the well fluid line 62 to provide well fluid as the motive fluid for fluidizing solids. In the illustrated arrangement, the motive fluid is provided to all of the fluidizing devices 52 via a single motive fluid line 60 which then branches off to the multiple inlets 54. In the illustrated arrangement, the motive fluid line 60 has an approximately 5.08 cm (2 inch) diameter, and the well fluid line 62 has an approximately 10.16 cm (4 inch) diameter.

The solid removal system 50 further comprises a control valve 64. The control valve 64 is for controlling flow of the motive fluid through the motive fluid line 60 from the well fluid line 62. In particular, operating the control valve 64 controls flow of the motive fluid through the motive fluid line 60. At least partially closing of the control valve 64 creates pressure necessary for the well fluid to flow through the motive fluid line 60 to the fluidizing devices 52.

In the illustrated arrangement, the fluidizing devices 52 require approximately 1 Bar (14.504 psi/100 kPa) of fluid pressure in order to fluidize solids. Closing of the control valve 64 may accordingly be configured to provide approximately 500 psi (3447.38 kPa) to 1000 psi (6894.76 kPa) of fluid pressure through the motive fluid line 60.

The solid removal system 50 further comprises inlet valves 66. In particular, an inlet valve 66 associated with each respective fluidizing device 52. Accordingly, in the illustrated arrangement, there are three (3) inlet valves 66. Each inlet valve 66 is for controlling flow of the motive fluid into the respective fluidizing device 52. The inlet valve 66 is connected to the motive fluid line 60 on one end, and to the inlet 54 of the respective fluidizing device 52 on the other end. The inlet valve 66 may thus control operation of a respective fluidizing device 52 by controlling introduction of the motive fluid into the separator for fluidizing solids in the separator 10.

The solid removal system 50 further comprises outlet valve 68s. In particular, each outlet valve 68 is associated with a respective fluidizing device 52. Accordingly, in the illustrated arrangement, there are three (3) outlet valves 68. Each outlet valve 68 is for controlling flow of the fluidized solids from the fluidizing device 52. The outlet valve 68 is connected is connected to the outlet 56 of the fluidizing device 52 at one end, and to a solid outlet line 70 at the other end. The outlet valve 68 may thus control operation of a respective fluidizing device 52 by controlling flow of the fluidized solids from the fluidizing device 52 to the solid outlet line 70.

While inlet valves 66 and outlet valves 68 have been described as being associated with each fluidizing device 52, some fluidizing device 52 may have no associated inlet valve 66 and/or outlet valve 68. In fact, it may be beneficial to reduce the number of valves 66, 68 in the system 50 in order to reduce weight or volume of the system 50, and therefore the weight or volume of the separator in particular applications.

In the illustrated arrangement, the fluidized solids flow from all of the fluidizing devices 52 to a single solid outlet line 70 which is branched to each outlet valve 68 connected to the outlet 56 of the various fluidizing devices 52. In the illustrated arrangement, the fluidized solids from the fluidizing devices 52 flow to a flushing choke which feeds solid handling equipment, e.g. a tank. Thus, the solid outlet line 70 is connected to the flushing choke.

The solid removal system 50 further comprises a controller for controlling operation of the control valve 64, inlet valves 66 and outlet valves 68. Control of the valves 64, 66, 68 may be based on a parameter. The parameter may be detected by one or more meters and/or gauges. In the illustrated arrangement, the parameter is a differential parameter of one or more fluids, e.g. motive fluid, fluidized solids, and well fluid entering the separator 10. For example, the controller controls operation of the control valve 64 and an inlet valve 66 of a respective fluidizing device 52 based on a differential pressure of the well fluid entering the separator and of the motive fluid. In another example, the controller controls operation of the control valve 64 and an inlet valve 66 based on an absolute pressure in motive fluid line 60. In another example, the controller controls operation of the outlet valve 68 of a respective fluidizing device 52 based on a differential pressure of the motive fluid and the fluidized solids exiting the fluidizing device 52.

In an exemplary arrangement, the controller detects a parameter (e.g. differential pressure of the well fluid entering the separator 10 and motive fluid in the motive fluid line 60, or absolute pressure in the motive fluid line 60); compares the parameter with a threshold level; and operates one or more the valves 64, 66, 68 based on the results of the comparison. For example, if the differential pressure of the well fluid flowing into the separator 10 and the motive fluid in the motive fluid line 60 is above a level required to operate at least one of the fluidizing devices 52, the controller operates (e.g. opens) the inlet valve 66 to allow motive fluid to flow into the inlet 54 and through the nozzle 58 of the respective fluidizing device 52 to fluidize solids in the separator 10. The controller further operates (e.g. opens) the outlet valve 68 of the respective fluidizing device 52 to allow fluidized solids to exit the separator 10.

The controller may be configured to operate certain the fluidizing devices 52 based on the described parameter. For example, only a particular number of fluidizing devices 52 may be operated based on available fluid pressure. Furthermore, only certain fluidizing devices 52 may be operated in order to fluidize sedimentary solids present at certain physical locations along the floor of the separator 10 which correspond with the approximate locations of the nozzles 58 of the respective fluidizing devices 52. In this manner, a fluidizing map or profile may be established. This may more efficiently fluidize solids in the separator and may use available fluid pressure more efficiently.

In the illustrated arrangement, compared with the prior art system depicted in FIG. 2, the fluidizing devices 52 are generally inverted. Accordingly, the flow path of fluidized solids out of the fluidizing devices 52 via the outlets 56 is in the same direction as gravity (downward), and opposite the direction of fluidized solids out of the described prior art fluidizing devices 48. This make solids removal more efficient as more solids may be fluidized and removed from the separator 10 when compared with prior art systems.

The flow path of the motive fluid through to the nozzles 58 is in the opposite direction of gravity, and opposite the direction of motive fluid out of the nozzles of the described prior art fluidizing devices 48. However, as the motive fluid is under pressure, the gravitational force is overcome to fluidize solids.

In addition, as the motive fluid is the well fluid fed into the separator pressure pumps are not required. Furthermore, pressure pumps to draw the fluidized solids from the separator 10 are not required as the orientation of the nozzle 58 and outlet 56 allows for gravity flow of the fluidized solids.

In the illustrated arrangement, the inlets 54 and outlets 56 of the fluidizing devices 52, as well as the motive fluid line 60 and solid outlet line 70 are external to the separator 10. Furthermore, the inlet valves 66 and outlet valves 68 are external to the separator 10. The nozzle 58 is within the separator 10. Thus, the volume occupied by the fluidizing devices 52 within the separator 10 is reduced which may provide improved operating capacity, flow rates and/or efficiency over conventional fluidizing devices. Furthermore, the components of the system 50 which are external to the separator 10 do not negatively impact the footprint of the separator 10 as this portion may be contained within a frame enclosing the separator 10.

Figure 4:
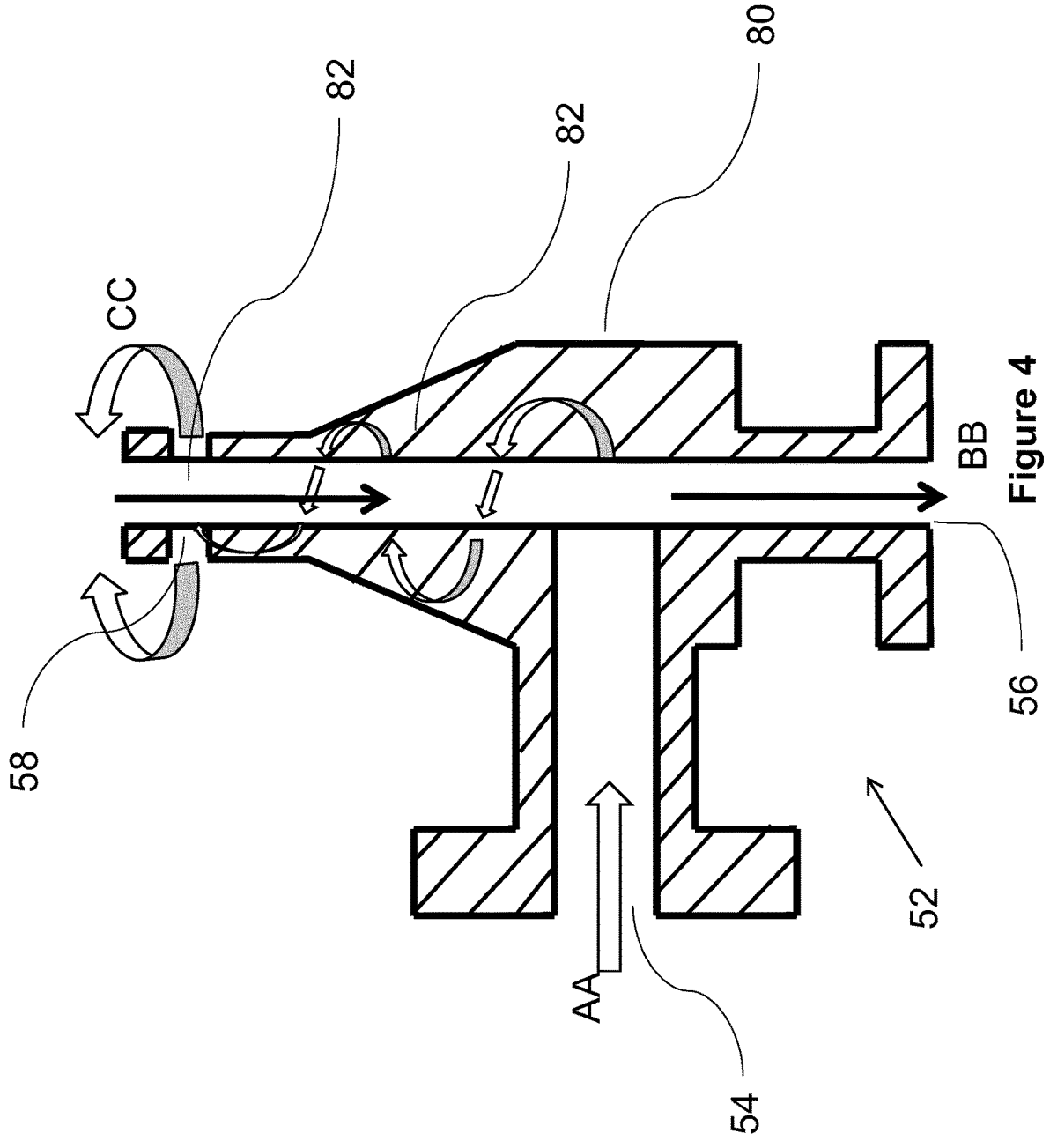
FIG. 4 is a sectional view of a fluidizing device.

Turning now to FIG. 4, a single fluidizing device 52 is shown in isolation. The fluidizing device 52 comprises a body 80 housing a chamber 82 through which motive fluid flows as will be described. As shown in FIG. 3, the majority of the housing is external to the separator 10. The fluidizing device 52 further comprises the inlet 54 which is generally perpendicular to a longitudinal axis of the body 80. The fluidizing device 52 further comprises the outlet 56 which is generally oriented in the same direction as the body 80, and the nozzle 58 which is generally oriented in the same direction as the body 80. The outlet 56 and nozzle 58 are coaxial. The inlet 54 is fluidly connected to the described inlet valve 66. Furthermore, the outlet is fluidly connected 56 is connected to the described outlet valve 68.

The inlet 54 is arranged such that during operation motive fluid flows tangentially into the chamber 82 of the body 80 in direction AA. The motive fluid generates a vortex through swirling motion around a central tube of the outlet 56. The generated vortex of motive fluid passes through the discharge 58 of the fluidizing device. The vortex of motive fluid swirls in direction CC entrains solids in the separator 10 thereby fluidizing the solids. Fluidizing comprises causing the solids to flow like a fluid (e.g. liquid or gas), and suspending the solids (in particular solid particles) in the motive fluid to induce flowing motion of the motive fluid and solids.

In operation, well fluid is produced by a well and flows through the well fluid line 62. The control valve 64 is operated (e.g. at least partially closed) to create the necessary pressure such that well fluid from the well fluid line 62 flows through the motive fluid line 60. The well fluid flowing through the motive fluid line 60 operates as motive fluid for the fluidizing devices 52. The motive fluid flows to the inlet valves 66 of the fluidizing devices 52. One or more of the inlet valves 66 are operated (e.g. opened) to allow motive fluid to flow through the inlet 54 of the respective fluidizing device 52. In the illustrated arrangement, the motive fluid flows through the inlet 54 tangentially to the body 80 of the fluidizing device 52 through the chamber 82 defined by the body 80. The motive fluid generates a vortex at the nozzle 58 to fluidize sedimentary solids present in the separator 10. The motive fluid at the nozzle 58 fluidizes and entrains solids present in the separator 10 to the outlet 56 of the respective fluidizing device 52. The outlet valve 68 of the fluidizing device 52 is operated (e.g. at least partially opened) such that the fluidized solids flow from the fluidizing device 52 to remove the fluidized solids from the separator 10. The solids exit the fluidizing device 52 through the outlet 56 and flow to the solid outlet line 70. The fluidized solids flow in the solid outlet line 70 to a flushing choke which feeds the solids to solid handling equipment, e.g. a tank.

The solid removal system 50 operates in-line with separation of the fluid components by the separator 10. Thus, there is no need to stop flow of well fluid from the well. This may decrease well clean-up and/or well testing times which may improve well operations such as financial benefits.

Figure 5:
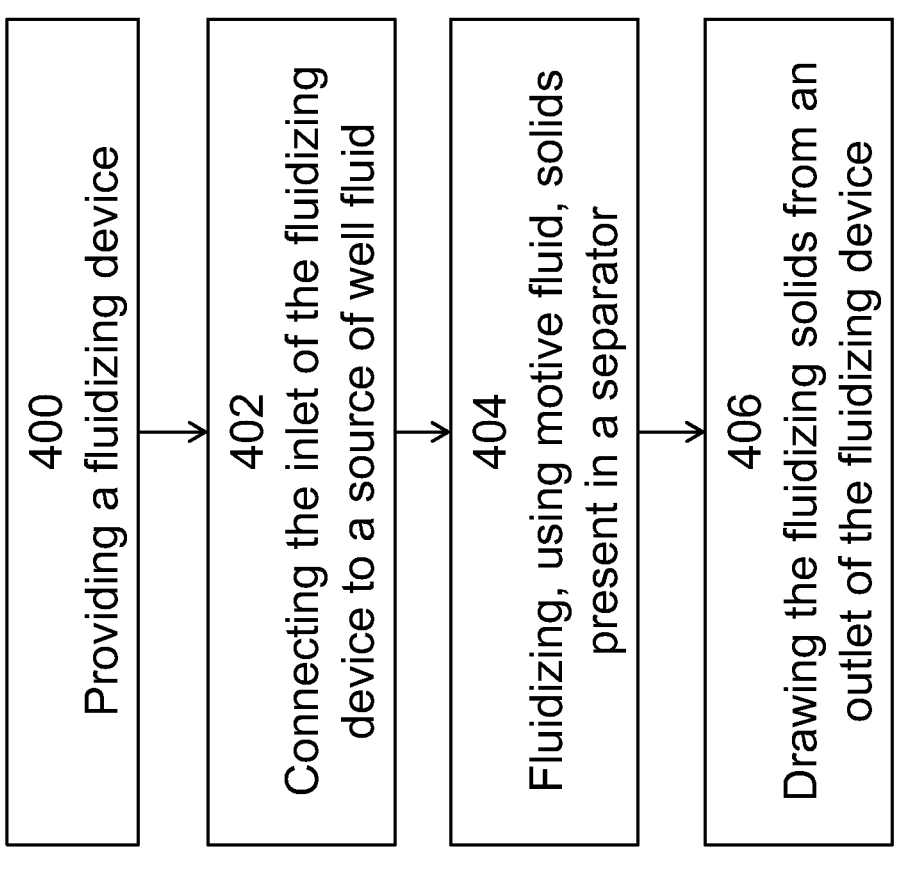
FIG. 5 is a flowchart of a method of removing solids from well fluid produced by a well.

FIG. 5 shows a flowchart of a method of removing solids from well fluid produced by a well. The method comprises providing 400 a fluidizing device for fluidizing solids present in well fluid produced by a well. The fluidizing device 52 may be as described above. Accordingly, the fluidizing device has an inlet 54 through which motive fluid for fluidizing solids is introduced and an outlet 56 through which fluidized solids exit the fluidizing device 52.

The method further comprises connecting 402 the inlet 54 of the fluidizing device 52 to a source of well fluid produced by the well such that motive fluid comprises well fluid produced by the well. The source of well fluid may be the described motive fluid line 60 which draws well fluid from the well fluid line 62.

The method further comprises fluidizing 404, using the motive fluid, solids present in a separator. The separator contains well fluid produced by the well. The separator may be the described separator 10.

The method further comprises drawing 406 the fluidized solids from the outlet 56 of the fluidizing device 52. The motive fluid fluidizes the solids by generating a vortex that entrains solids in the separator 10 to draw the solids into the fluidizing device 52 and through the outlet 56.

Figure 6:
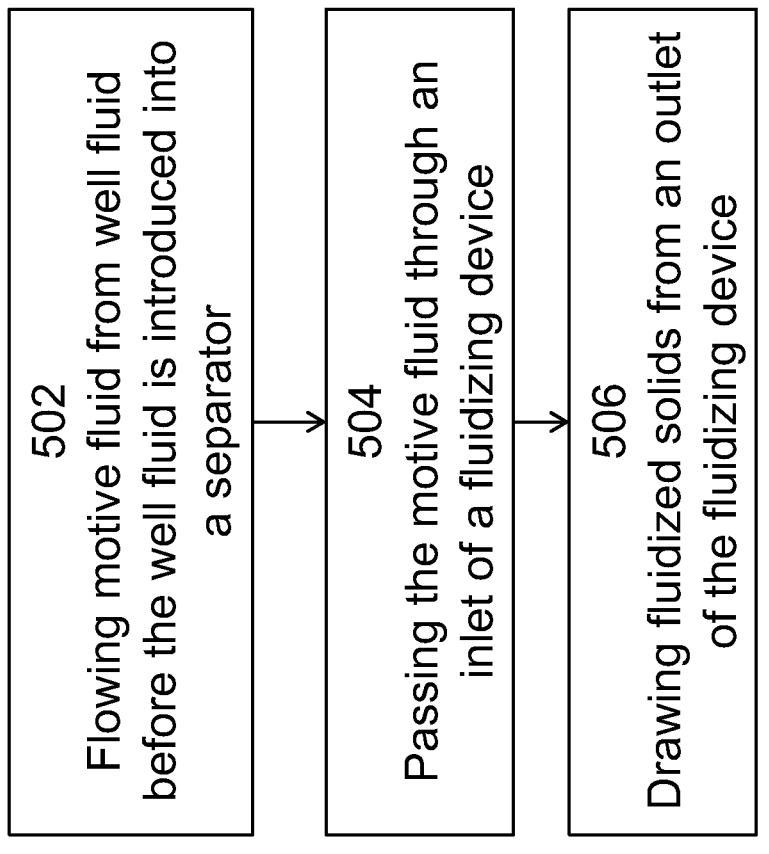
FIG. 6 is a flowchart of a method of removing solids from well fluid produced by a well.

FIG. 6 shows a flowchart of a method of removing solids from well fluid produced by a well. The method may be performed by the described solid removal system 50.

The method comprises flowing 502 motive fluid from well fluid before the well fluid is introduced into the separator 10 for separating components of the well fluid. Flowing 502 comprises controlling operation of the control valve 64 and/or inlet valve 66.

The method further comprises passing 504 the well fluid through the inlet of the fluidizing device 52 for fluidizing solids present in the well fluid introduced into the separator 10. Passing 504 comprises controlling operation of the inlet valve 66 to control flow of the motive fluid through the nozzle 58.

The method further comprises flowing 506 the fluidized solids from the outlet of the fluidizing device 52. Flowing 506 comprises controlling operation of the outlet valve 68.

The method further comprises controlling a flow rate of the motive fluid from the well fluid line 62. Controlling the flow rate comprises controlling operation of the control valve 64 connected to the well fluid line 62. The flow rate is controlled based on a parameter of the motive fluid such as a differential pressure. The differential pressure may be between the pressure of the motive fluid within the motive fluid line 60 and the pressure of the well fluid into the inlet 12 of the separator 10.

The method further comprises controlling a flow rate of the motive fluid through the fluidizing device 52. Controlling the flow rate of the motive fluid comprises controlling operation of the inlet valve 66 connected to the inlet 54 of the fluidizing device 52. Controlling the flow rate is based on a parameter of the motive fluid and/or the fluidized solids. The parameter comprises a differential pressure of the motive fluid and/or the fluidized solids. For example, the differential pressure may be the pressure of the motive fluid at the inlet 54 and the pressure of the fluidized solids at the outlet 56.

The method further comprises controlling a flow rate of the fluidized solids from the fluidizing device 52. Controlling the flow rate of the fluidized solids comprises controlling operation of the outlet valve 68 connected to the outlet 56 of the fluidizing device 52. Controlling the flow rate is based on a parameter of the motive fluid and/or the fluidized solids. The parameter comprises a differential pressure of the motive fluid and/or the fluidized solids. For example, the differential pressure may be the pressure of the motive fluid at the inlet 54 and the pressure of the fluidized solids at the outlet 56.

In the illustrated embodiment, the solid removal system 50 is configured for use with the separator 10 as described. As such, the diverter plates 22 and inlet 12 are shown in FIG. 3. While a portion of the particular separator 10 is depicted in FIG. 3, one of skill in the art will appreciate the solid removal system 50 may be used with other separators.

While in the illustrated embodiment, the solid removal system 50 comprises three (3) fluidizing devices 52, one of skill in the art will appreciate that more or fewer fluidizing devices 52 may be present. In particular, the number of fluidizing devices 52 present may be selected based on the size and/or capacity of the separator, the flow rate of the well fluid produced by the well, the amount of solids estimated to be present in well fluid, or combinations thereof.

While the solid removal system 50 is described in relation to the separator 10 having a horizontal pressure vessel is described, one of skill in the art would appreciate that other configurations are possible. The separator may comprise a vertical pressure vessel. Furthermore, while the pressure vessel in the illustrated arrangement has been described as generally cylindrical, a spherical pressure vessel may also be possible.

The described method may be performed by a controller which is manually controlled by an operator or autonomously controlled based on prescribed parameters.

A computer-readable medium comprising instructions that, when executed by a processor, may operate one or more flow control devices to perform the described method. The flow control devices may include the control valve 64, the inlet valve 66 and the outlet valve 68.

Accordingly, it should be understood that embodiments described herein are merely exemplary and that various modifications may be made thereto without departing from the scope of the invention.

The invention claimed is:

1. A system for removing sedimentary solids from a separator, the separator for separating components of a well fluid flow produced by a well, the system comprising:
    an inlet for receiving a motive fluid flow;
    a nozzle configured to introduce the motive fluid flow to the sedimentary solids in the separator, thereby fluidizing the sedimentary solids; and
    an outlet configured to allow the fluidized solids to exit the separator;
    a motive fluid line for introducing the motive fluid flow into the inlet, the motive fluid line connected to a well fluid line at a motive fluid line connection, the well fluid line for introducing the well fluid into the separator; and
    a control valve for controlling the motive fluid flow through the motive fluid line from the well fluid line, wherein the motive fluid flow comprises well fluid flow produced from the well; and
    wherein the control valve is disposed in-line with the well fluid line upstream of the separator and downstream of the motive fluid line connection;
    wherein the control valve is configured to be at least partially closeable to create a differential pressure between the well fluid line and the separator such that well fluid flows through the motive fluid line.

2. The system of claim 1, further comprising:
    an inlet valve for controlling flow of the motive fluid into the inlet;
    wherein the inlet valve is configured to control introduction of the motive fluid into the separator for fluidizing the sedimentary solids in the separator.

3. The system of claim 2, further comprising:
    an outlet valve for controlling flow of the fluidized solids from the outlet thereby controlling removal of the fluidized solids from the separator.

4. The system of claim 3, further comprising:
    a controller for controlling operation of at least one of the control valve, the inlet, or the outlet valve based on a parameter of at least one of the motive fluid flow or the fluidized solids.

5. The system of claim 4, wherein the parameter comprises a flow rate, an absolute pressure or a differential pressure.

6. The system of claim 5, wherein the parameter comprises the absolute pressure in the motive fluid line.

7. The system of claim 5, wherein the parameter comprises the differential pressure of the well fluid entering the separator and the motive fluid in the well fluid line.

8. The system of claim 1, wherein the inlet and/or outlet is external to the separator.

9. The system of claim 1, wherein the outlet is configured such that the fluidized solids flow through the outlet in a same direction as gravity.

10. The system of claim 1, wherein the nozzle is configured to direct the motive fluid to entrain the sedimentary solids; and wherein the nozzle is configured to direct the motive fluid to generate a vortex for fluidizing the sedimentary solids.

11. A system for removing sedimentary solids from a separator, the separator configured to receive a well fluid flow from a well through a well fluid line, the system comprising:

a control valve disposed in-line with the well fluid line at a first point upstream of the separator, wherein the control valve is configured to be controlled between a first setting and a second setting, and the second setting is partially closed relative to the first setting;

a motive fluid line in fluid communication with the well fluid line at a second point upstream of the control valve, wherein the motive fluid line is configured to receive a motive fluid flow from the well fluid in the well fluid line;

an inlet for receiving the motive fluid flow from the motive fluid line;

a nozzle configured to introduce the motive fluid flow to the sedimentary solids in the separator, thereby fluidizing the sedimentary solids; and an outlet configured to allow the fluidized solids to exit the separator;

wherein the system is configured such that the motive fluid flow within the motive fluid line is controlled by controlling the control valve between the first setting and the second setting.

12. A system for removing sedimentary solids from a separator, the separator configured to receive a well fluid flow from a well through a well fluid line, the system comprising:

a control valve disposed in-line with the well fluid line at a first point upstream of the separator, wherein the control valve is configured to be controlled between a first setting and a second setting, and the second setting is partially closed relative to the first setting;

a motive fluid line in fluid communication with the well fluid line at a second point upstream of the control valve, wherein the motive fluid line is configured to receive a motive fluid flow from the well fluid in the well fluid line; and a fluidizing device having an inlet, a nozzle, and an outlet, wherein the inlet is disposed to receive the motive fluid flow from the motive fluid line, the nozzle is in fluid communication with a gravitational base of the separator, and the outlet is in fluid communication with the gravitational base of the separator;

wherein the nozzle is disposed to receive the motive fluid flow from the inlet and direct the motive fluid flow into the separator in a direction opposite a gravitational vector, and the outlet is disposed to receive fluidized solids from the separator; and wherein the system is configured such that the motive fluid flow within the motive fluid line is controlled by controlling the control valve between the first setting and the second setting.

13. The system of claim 12, wherein the fluidizing device includes a body housing a chamber that extends along an axial centerline, and the nozzle is disposed at a first axial end of the chamber and the outlet is disposed at a second axial end of the chamber, wherein the second axial end is opposite the first axial end; and wherein the inlet is disposed to direct the motive fluid flow into the chamber in a direction that is tangential to the axial centerline of the chamber.

\* \* \* \* \*